United States Patent
Udatsu et al.

(10) Patent No.: US 11,559,764 B2
(45) Date of Patent: Jan. 24, 2023

(54) CARBON DIOXIDE CAPTURING SYSTEM AND METHOD OF OPERATING THE SAME

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Mitsuru Udatsu, Kawasaki Kanagawa (JP); Noriko Takada, Yokohama Kanagawa (JP); Yusuke Handa, Tokyo (JP); Hideo Kitamura, Tokyo (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 260 days.

(21) Appl. No.: 16/939,167

(22) Filed: Jul. 27, 2020

(65) Prior Publication Data
US 2021/0077948 A1 Mar. 18, 2021

(30) Foreign Application Priority Data
Sep. 12, 2019 (JP) .............................. JP2019-166232

(51) Int. Cl.
| | |
|---|---|
| *B01D 53/14* | (2006.01) |
| *B01D 19/00* | (2006.01) |
| *B01D 53/34* | (2006.01) |
| *B01D 53/62* | (2006.01) |

(Continued)

(52) U.S. Cl.
CPC ....... *B01D 53/1475* (2013.01); *B01D 19/001* (2013.01); *B01D 53/1425* (2013.01); *B01D 53/346* (2013.01); *B01D 53/62* (2013.01); *B01D 53/78* (2013.01); *B01D 53/96* (2013.01);

(Continued)

(58) Field of Classification Search
None
See application file for complete search history.

(56) References Cited

U.S. PATENT DOCUMENTS

| 8,663,363 B2 | 3/2014 | Iijima et al. |
|---|---|---|
| 2001/0021362 A1 | 9/2001 | Ishida |
| 2011/0120128 A1 | 5/2011 | Handagama |

(Continued)

FOREIGN PATENT DOCUMENTS

| EP | 2679295 B1 * | 6/2016 | ......... B01D 53/1412 |
|---|---|---|---|
| JP | H10-165761 A | 6/1998 | |

(Continued)

*Primary Examiner* — Philip Y Louie
(74) *Attorney, Agent, or Firm* — Foley & Lardner LLP

(57) ABSTRACT

In one embodiment, a carbon dioxide capturing system includes an absorber to absorb CO2 from first gas into lean liquid, and produce rich liquid that is the lean liquid absorbing the CO2 and second gas that is the first gas removing the CO2, and a regenerator to separate third gas including the CO2 from the rich liquid flowing from the absorber, and provide the lean liquid and the third gas. The system further includes a flowmeter to measure a flow rate of the third gas, a liquid level gauge to measure a liquid level of the lean liquid and/or the rich liquid, and a controller to regulate a quantity of heat energy supplied to the regenerator based on the flow rate of the third gas, and regulate a total amount of the lean liquid and the rich liquid in the system based on the liquid level.

9 Claims, 10 Drawing Sheets

(51) Int. Cl.
 *B01D 53/78* (2006.01)
 *B01D 53/96* (2006.01)
(52) U.S. Cl.
 CPC .. *B01D 2252/204* (2013.01); *B01D 2257/504* (2013.01); *B01D 2258/0283* (2013.01)

(56) References Cited

U.S. PATENT DOCUMENTS

| | | |
|---|---|---|
| 2013/0183218 A1 | 7/2013 | Hiwale et al. |
| 2013/0333559 A1 | 12/2013 | Nakagawa |
| 2013/0343976 A1 | 12/2013 | Udatsu et al. |
| 2018/0001254 A1 | 1/2018 | Fujita |

FOREIGN PATENT DOCUMENTS

| | | |
|---|---|---|
| JP | 2011-000528 A | 1/2011 |
| JP | 2015-223555 A | 12/2015 |
| JP | 2018-001086 A | 1/2018 |
| JP | 2019-118902 A | 7/2019 |

\* cited by examiner

CARBON DIOXIDE CAPTURING SYSTEM AND METHOD OF OPERATING THE SAME

CROSS REFERENCE TO RELATED APPLICATION

This application is based upon and claims the benefit of priority from the prior Japanese Patent Application No. 2019-166232, filed on Sep. 12, 2019, the entire contents of which are incorporated herein by reference.

FIELD

Embodiments described herein relate to a carbon dioxide capturing system and a method of operating the same.

BACKGROUND

In recent years, carbon dioxide capture and storage (CCS) technology has been paid attention as an effective measure against the global warming problem. For example, it is considered to use a carbon dioxide capturing system that captures carbon dioxide with absorbing liquid from process exhaust gas (process target gas), which is generated from an exhaust gas discharge facility such as a thermal power plant, steel mill, trash burning site, and manufacturing facility.

In addition, it is considered to use the carbon dioxide captured by the carbon dioxide capturing system. In the case of using the carbon dioxide, it is necessary to constantly supply a certain amount of carbon dioxide depending on the process of a use destination. However, there is a problem that it is difficult to stably and continuously supply a certain amount of carbon dioxide due to various fluctuation factors, such as fluctuations in the concentration of carbon dioxide in the process exhaust gas, fluctuations in the system, and reduction in efficiency caused by deterioration of the absorbing liquid.

DETAILED DESCRIPTION

Figure 1:
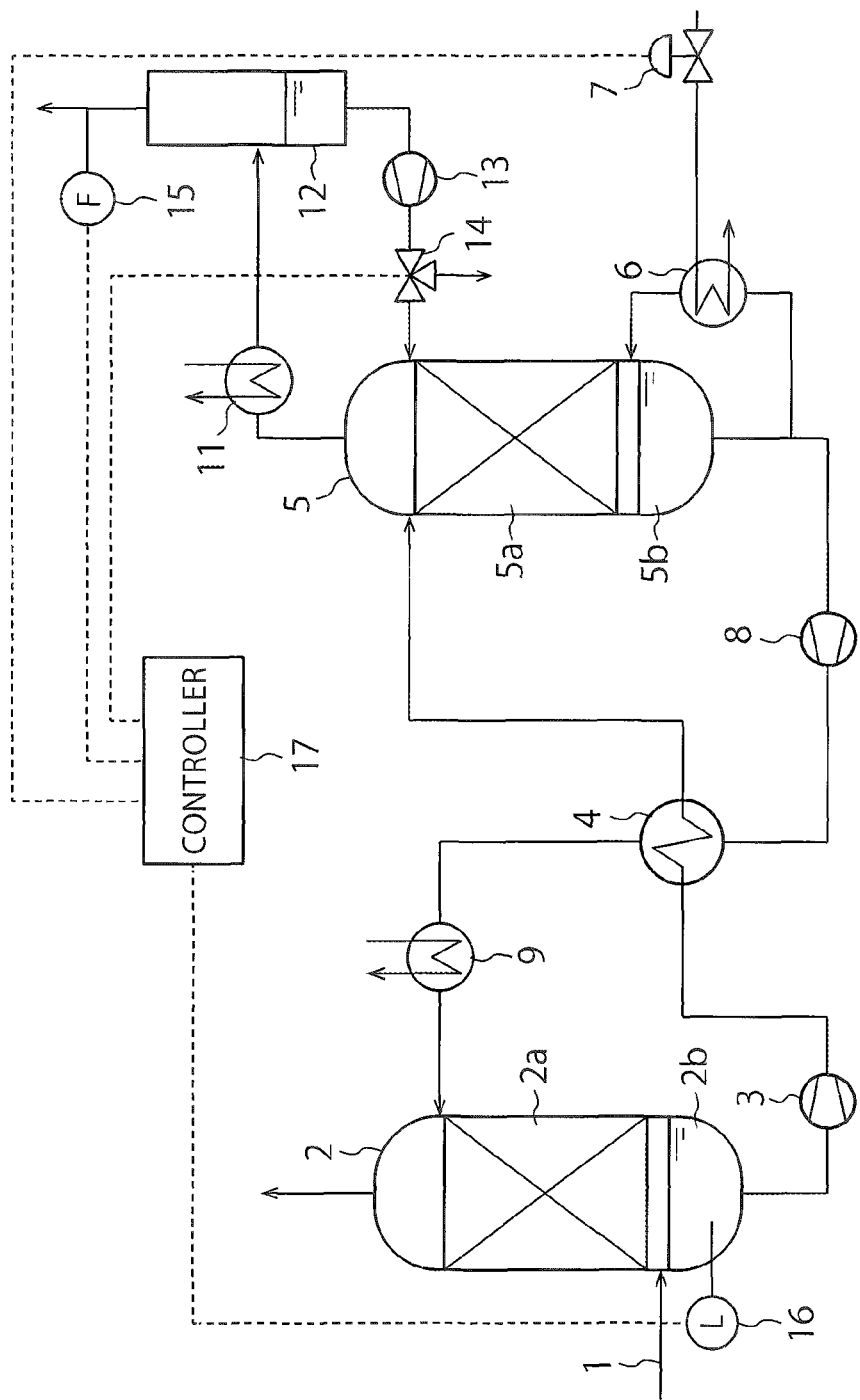
FIG. 1 is a schematic diagram illustrating a configuration of a carbon dioxide capturing system of a first embodiment.

In one embodiment, a carbon dioxide capturing system includes an absorber configured to absorb carbon dioxide from first gas into lean liquid, and configured to produce rich liquid that is the lean liquid absorbing the carbon dioxide and second gas that is the first gas removing the carbon dioxide, and a regenerator configured to separate third gas including the carbon dioxide from the rich liquid flowing from the absorber, and configured to provide the lean liquid and the third gas. The system further includes a flowmeter configured to measure a flow rate of the third gas, a liquid level gauge configured to measure a liquid level of at least one of the lean liquid and the rich liquid, and a controller configured to regulate a quantity of heat energy supplied to the regenerator based on the flow rate of the third gas, and configured to regulate a total amount of the lean liquid and the rich liquid in the carbon dioxide capturing system based on the liquid level.

Embodiments will now be explained with reference to the accompanying drawings. In FIGS. 1 to 10, the same components are denoted by the same reference numerals, and redundant description thereof will not be repeated.

First Embodiment

FIG. 1 is a schematic diagram illustrating a configuration of a carbon dioxide capturing system of a first embodiment.

The carbon dioxide capturing system of the present embodiment includes, as illustrated in FIG. 1, a process exhaust gas line 1, an absorber 2, a rich liquid pump 3, a regenerative heat exchanger 4, a regenerator 5, a reboiler 6, a steam flow control valve 7, a lean liquid pump 8, a lean liquid cooler 9, a gas cooler 11, a gas-liquid separator 12, a condensed water pump 13, a three-way valve 14, a flowmeter 15, a liquid level gauge 16, and a controller 17.

The process exhaust gas line 1 is a flow path that supplies process exhaust gas such as combustion exhaust gas into the absorber 2. The process exhaust gas discharged from an exhaust gas discharge facility is introduced via the process exhaust gas line 1 into the absorber 2. The exhaust gas discharge facility is, for example, a power plant such as a thermal power plant, a factory of a steel mill or a waste incineration plant, or a combustion facility such as a trash burning site or a manufacturing facility. The process exhaust gas is an example of process target gas (first gas) to be processed by the carbon dioxide capturing system.

The absorber 2 is, for example, an absorbing tower that is configured by a countercurrent gas-liquid contactor, and includes a packed bed 2a and a liquid reservoir 2b. The absorber 2 includes a gas introduction port for introducing the process exhaust gas (first gas) below the packed bed 2a and an absorbing liquid introduction port for introducing absorbing liquid (lean liquid) above the packed bed 2a. The liquid reservoir 2b is provided at the bottom of the absorber 2 and is positioned below the packed bed 2a. The lean liquid introduced from the absorbing liquid introduction port falls into the packed bed 2a, and the process exhaust gas (first gas) introduced from the gas introduction port rises to the packed bed 2a.

The absorber 2 brings the process exhaust gas (first gas) into gas-liquid contact with the lean liquid in the packed bed 2a, and causes the lean liquid to absorb carbon dioxide in the process exhaust gas (first gas). As a result, the absorbing liquid (rich liquid) that has absorbed the carbon dioxide falls from the packed bed 2a and is accumulated in the liquid reservoir 2b. The rich liquid is discharged to the outside through an absorbing liquid discharge port provided at the bottom of the absorber 2. On the other hand, absorber discharge gas (second gas) containing the process exhaust gas (first gas) from which the carbon dioxide has been removed rises from the packed bed 2a and is discharged (released) to the outside from the top of the absorber 2.

The absorber 2, although it includes only one packed bed 2a, may include a plurality of packed beds 2a or may include one or more reaction units (for example, trays), instead. In addition, the carbon dioxide capturing system of the present embodiment may include a cleaning unit that cleans the absorber discharge gas (second gas) and a cooling unit that cools the absorber discharge gas (second gas).

An example of the absorbing liquid is an amine-based aqueous solution containing one or more amines. Monoethanolamine and diethanolamine are exemplary amines. The absorbing liquid may contain other amines and may further contain additives or the like depending on the purpose.

The absorbing liquid (rich liquid) discharged from the absorbing liquid discharge port of the absorber 2 is transferred to the regenerator 5, via the regenerative heat exchanger 4, by the rich liquid pump 3. At this time, the rich liquid flowing from the absorber 2 to the regenerator 5 is heated through heat exchange in the regenerative heat exchanger 4.

The regenerator 5 is, for example, a regenerating tower configured by a countercurrent gas-liquid contactor, and includes a packed bed 5a and a liquid reservoir 5b. The regenerator 5 includes an absorbing liquid introduction port for introducing the absorbing liquid (rich liquid) discharged from the absorber 2 above the packed bed 5a. The liquid reservoir 5b is provided at the bottom of the regenerator 5 and is positioned below the packed bed 5a.

The regenerator 5, by heating the rich liquid introduced from the absorbing liquid introduction port, causes most of the carbon dioxide to be released together with steam from the rich liquid, thereby separating the carbon dioxide from the rich liquid. Specifically, the regenerator 5 is equipped with the reboiler 6 and supplies, to the reboiler 6, a part of the lean liquid obtained from the rich liquid introduced from the absorbing liquid introduction port. The reboiler 6 is further supplied with high-temperature steam via the steam flow control valve 7. The reboiler 6 heats the lean liquid through heat exchange between the high-temperature steam and the lean liquid, thereby causing the carbon dioxide and the steam to be released from the lean liquid. Then, the regenerator 5 heats, in the packed bed 5a, the rich liquid introduced from the absorbing liquid introduction port by using the carbon dioxide and the steam generated in the reboiler 6. As a result, most of the carbon dioxide is released together with the steam from the rich liquid. The absorbing liquid (lean liquid) that has passed through the packed bed 5a falls into the liquid reservoir 5b.

As a result, the absorbing liquid (lean liquid) from which the carbon dioxide has been released is accumulated in the liquid reservoir 5b and is discharged, to the outside, from the absorbing liquid discharge port provided at the bottom of the regenerator 5. On the other hand, regenerator discharge gas (third gas) containing the released carbon dioxide and steam is discharged, to the outside, from a gas discharge port provided at the top of the regenerator 5.

The absorbing liquid (lean liquid) discharged from the absorbing liquid discharge port of the regenerator 5 is returned to the absorber 2, by the lean liquid pump 8, via the regenerative heat exchanger 4 and the lean liquid cooler 9. At this time, the lean liquid flowing from the regenerator 5 to the absorber 2 is adjusted to a predetermined temperature through heat exchange in the regenerative heat exchanger 4 and cooling in the lean liquid cooler 9. The regenerative heat exchanger 4 exchanges heat between the rich liquid flowing from the absorber 2 to the regenerator 5 and the lean liquid flowing from the regenerator 5 to the absorber 2.

Further, the regenerator discharge gas (third gas) discharged from the gas discharge port of the regenerator 5 is cooled by the gas cooler 11 and the gas-liquid separator 12. As a result, the steam in the regenerator discharge gas (third gas) is condensed, the carbon dioxide remaining in the regenerator discharge gas (third gas) is separated from the condensed water. The condensed water is returned, by the condensed water pump 13, to the regenerator 5 via the three-way valve 14, to maintain the total amount of the lean liquid and the rich liquid held in the carbon dioxide capturing system illustrated in FIG. 1 at a constant level. When it is desirable to decrease the total amount of the lean liquid and the rich liquid held in the carbon dioxide capturing system illustrated in FIG. 1, the three-way valve 14 can discard the condensed water by discharging the condensed water to the outside without returning it to the regenerator 5.

On the other hand, the flowmeter 15 is provided in a pipe in which the condensed water and the separated carbon dioxide flow. The flowmeter 15 measures the flow rate of the carbon dioxide flowing in this pipe, and outputs a measurement value of the flow rate to the controller 17. The controller 17 can calculate, based on the measurement value, a carbon dioxide capturing amount in the carbon dioxide system. Further, the controller 17 can calculate the carbon dioxide capturing amount in the carbon dioxide system, based on the carbon dioxide concentration in the process exhaust gas (first gas) flowing in the process exhaust gas line 1, the carbon dioxide concentration in the absorber discharge gas (second gas) discharged from the absorber 2, and the flow rate of each gas. The carbon dioxide discharged from the gas-liquid separator 12 is supplied, through a tail-end process such as compression and dehumidification, to a destination where the carbon dioxide is used, according to the purpose.

The regenerator 5, although it includes only one packed bed 5a, may include a plurality of packed beds 5a or may include one or more reaction units (for example, trays), instead. In addition, instead of being configured as the regenerating tower including the packed bed 5a and the liquid reservoir 5b, the regenerator 5 may be configured to include a flash drum (flash tank) that heats absorbing liquid (rich liquid) in a tank to release carbon dioxide together with steam. In this case, the regenerator 5 may include, for example, an electric heater, as a heater that heats the rich liquid. Further, the carbon dioxide capturing system of the present embodiment may include a cleaning unit that cleans the regenerator discharge gas (third gas) and a compression facility that compresses carbon dioxide obtained from the regenerator discharge gas (third gas).

The liquid reservoir 2b of the absorber 2 is provided with the liquid level gauge (level indicator) 16. The liquid level gauge 16 measures the liquid level of the rich liquid accumulated in the liquid reservoir 2b, and outputs a measurement value of the liquid level to the controller 17. In the present embodiment, as the total amount of the lean liquid and the rich liquid held in the carbon dioxide capturing system increases, the amount of the rich liquid accumulated in the liquid reservoir 2b of the absorber 2 and the amount of the lean liquid accumulated in the liquid reservoir 5b of the regenerator 5 increase. Therefore, the liquid level of the rich liquid in the liquid reservoir 2b of the absorber 2 and the liquid level of the lean liquid in the liquid reservoir 5b of the regenerator 5 can be used to evaluate the total amount of the lean liquid and the rich liquid held in the carbon dioxide capturing system. Accordingly, the controller 17 of the present embodiment can calculate, based on the measurement value output from the liquid level gauge 16, the total amount of the lean liquid and the rich liquid held in the carbon dioxide system.

The liquid level gauge 16 may be provided in the liquid reservoir 5b of the regenerator 5. In this case, the liquid level gauge 16 measures the liquid level of the lean liquid accumulated in the liquid reservoir 5b of the regenerator 5, and outputs a measurement value of the liquid level to the controller 17. Further, the liquid level gauge 16 may be provided in an absorbing liquid tank between the absorber 2 and the regenerator 5. An example of the absorbing liquid tank is an absorbing liquid buffering tank (not illustrated) provided between the regenerative heat exchanger 4 and the lean liquid cooler 9 to buffer fluctuations in the liquid level. In this case, the liquid level gauge 16 measures the liquid level of the lean liquid accumulated in the absorbing liquid buffering tank, and outputs a measurement value of the liquid level to the controller 17. In these cases, the controller 17 can calculate, based on the measurement value output from the liquid level gauge 16, the total amount of the lean liquid and the rich liquid held in the carbon dioxide system.

The controller 17 controls various operations of the carbon dioxide capturing system. Examples of the controller 17 include a processor, an electric circuit, and a computer. The controller 17 controls, for example, rotational speeds of the rich liquid pump 3, the lean liquid pump 8, and the condensed water pump 13, cooling operations of the lean liquid cooler 9 and the gas cooler 11, a heating operation of the reboiler 6, and opening/closing operations of the steam flow control valve 7 and the three-way valve 14. The controller 17 further performs calculations necessary for these controls and captures measurement values necessary for these calculations.

The controller 17 of the present embodiment controls (regulates) the quantity of heat energy supplied to the regenerator 5 based on the flow rate of the regenerator discharge gas (third gas) measured by the flowmeter 15. The controller 17 of the present embodiment further controls (regulates), based on the liquid level of the rich liquid measured by the liquid level gauge 16, the total amount of the lean liquid and the rich liquid held in the carbon dioxide capturing system. Hereinafter, these controls will be described in detail. In an exemplarily case described below, the flowmeter 15 measures the flow rate of the carbon dioxide gas, as the flow rate of the regenerator discharge gas (third gas).

Figure 2:
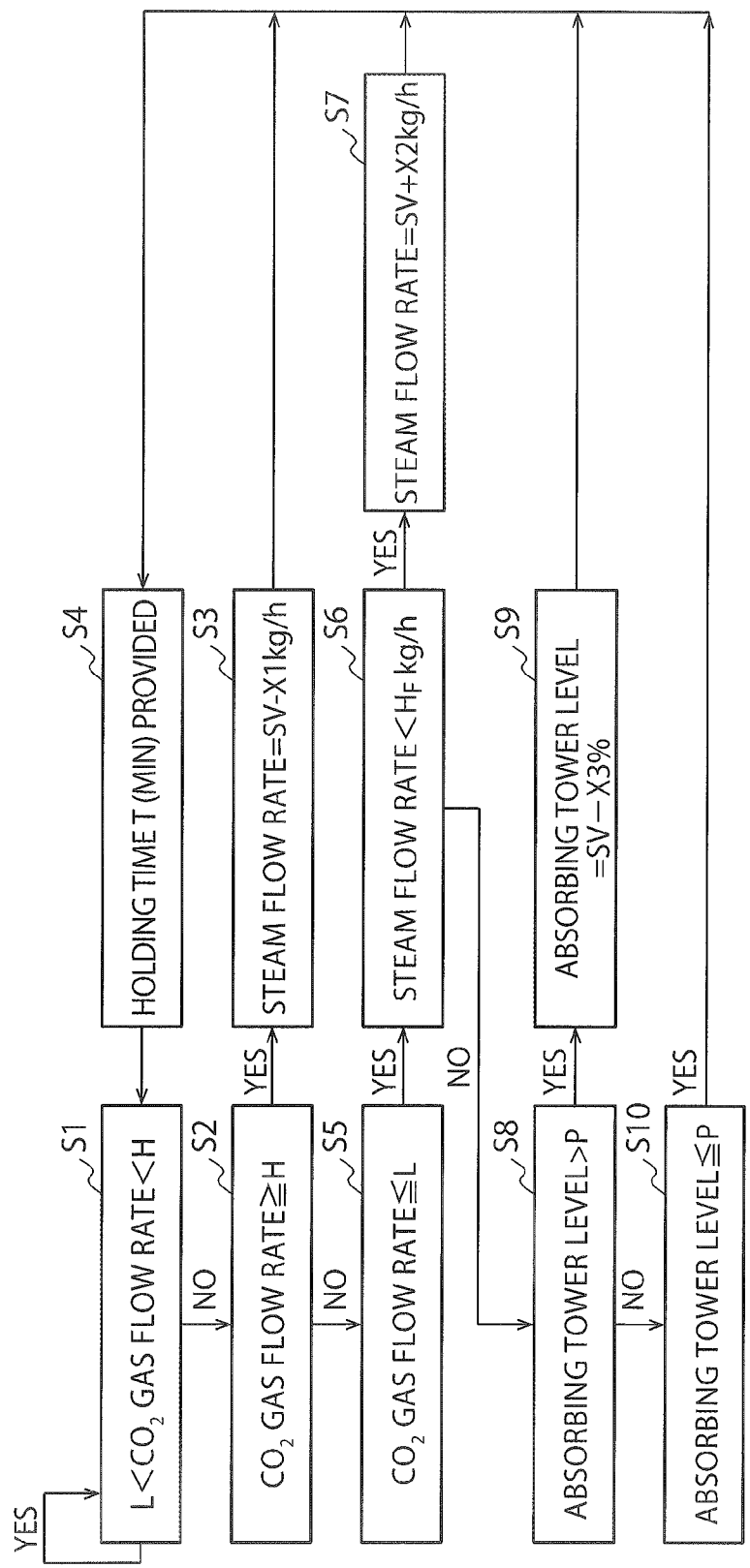
FIG. 2 is a diagram illustrating an operation of the carbon dioxide capturing system of the first embodiment.

FIG. 2 is a diagram illustrating an operation of the carbon dioxide capturing system of the first embodiment. FIG. 2 illustrates an exemplary flow of control by the controller 17 of the first embodiment. The carbon dioxide capturing system of the first embodiment is controlled according to the control flow illustrated in FIG. 2, so that the carbon dioxide capturing amount becomes constant.

First, the controller 17 receives, from the flowmeter 15, the measurement value of the flow rate of the carbon dioxide gas (third gas) discharged from the regenerator 5, and determines whether the measurement value is within a specified range (step S1). Here, "L" represents a lower limit of the specified range and "H" represents an upper limit of the specified range. The controller 17 determines whether the measurement value is greater than "L" and less than "H".

When the flow rate of the carbon dioxide gas (third gas) deviates from this range, the steam flow rate of the reboiler 6 being a heat source of the regenerator 5 is adjusted. The steam flow rate, in this case, is the flow rate of high-temperature steam supplied from the steam flow control valve 7 to the reboiler 6.

The controller 17, when detecting that the flow rate of the carbon dioxide gas (third gas) is equal to or greater than "H" (step S2), decreases the set value ("SV" value) of the steam flow rate of the reboiler 6 by "X1" from the present set value (step S3). As a result, the opening degree of the steam flow control valve 7 decreases, and the flow rate of the high-temperature steam supplied from the steam flow control valve 7 to the reboiler 6 decreases. Further, the quantity of heat energy supplied to the regenerator 5 per unit time decreases. When the flow rate of the high-temperature steam decreases, the temperature of the regenerator 5 decreases and the amount of the carbon dioxide released from the regenerator 5 decreases. As a result, the flow rate of the carbon dioxide gas from the regenerator 5 decreases, and the flow rate changes to a value within the above-described range from "L" to "H". In the illustrated flow, the condition in step S2 is not limited to "equal to or greater than "H"" and may be replaced by "greater than "H"". Further, the value of "X1" may be a constant value or a variable value.

Here, until the determination in step S1 is performed again after the change of the set value of the steam flow rate in step S3, a predetermined holding time is provided (step S4). This time is provided because the elapse of a certain amount of time is necessary after the change of process conditions until a change occurs as a result in the flow rate of the carbon dioxide gas (third gas). The time required as the holding time is dependent on the amount of process processing, and is different for each carbon dioxide capturing system. Therefore, in the present embodiment, an arbitrary time can be set as the holding time.

The holding time in step S4 appears in second to fifth embodiments described later and may be different for each embodiment. Although in step S4 the holding time is employed as a trigger for performing the processing in step S1 again, any other trigger may be employed. For example, in step S4, it may be determined whether the process following step S3 is stable based on some measurement values or an average value, a median value, or a standard deviation that can be obtained based on the measurement values. The determination result may be used as a trigger to perform the processing in step S1 again. Although step S4 follows each of steps S3, S7, S9, and S10, the holding time in step S4 may be different for each of steps S3, S7, S9, and S10.

On the other hand, the controller 17, when detecting that the flow rate of the carbon dioxide gas (third gas) is equal to or less than "L" (step S5), if the determination result in step S6 is "YES", increases the set value ("SV" value) of the steam flow rate of the reboiler 6 by "X2" from the present set value (step S7). As a result, the opening degree of the steam flow control valve 7 increases, the flow rate of the high-temperature steam supplied from the steam flow control valve 7 to the reboiler 6 increases, and the quantity of heat energy supplied to the regenerator 5 per unit time increases. When the flow rate of the high-temperature steam increases, the amount of the carbon dioxide released from the regenerator 5 increases. As a result, the flow rate of the carbon dioxide gas (third gas) from the regenerator 5 increases, and the flow rate changes to a value within the above-described range from "L" to "H". The condition of step S5 is not limited to "equal to or less than "L"" and may be replaced by "less than "L"". Further, the value of "X2" may be a constant value or a variable value.

Here, until the determination in step S1 is performed again after the change of the set value of the steam flow rate in step S7, a predetermined holding time is provided (step S4). The details of step S4 are as described above.

In step S7, it is not desirable to increase the steam flow rate supplied to the reboiler 6 endlessly because of the ability of a steam supplying source that supplies the high-temperature steam to the reboiler 6 or the problem of upper limit in design of the carbon dioxide capturing system. Therefore, in step S6, it is determined whether the steam flow rate of the reboiler 6 is less than an upper limit "HF". When the steam flow rate is less than the upper limit "HF", the processing proceeds to step S7. When the steam flow rate is equal to or greater than the upper limit "HF", the processing proceeds to step S8. The condition in step S6 is not limited to "less than "HF"" and may be replaced by "equal to or less than "HF"".

As described above, according to steps S1 to S7, short-term and sudden process fluctuations in which the flow rate of the carbon dioxide gas (third gas) from the regenerator cannot be maintained in the specified range can be suppressed, and the flow rate of the carbon dioxide from the regenerator 5 can be maintained stably.

On the other hand, the absorbing liquid of the present embodiment encounters a problem that absorbing liquid components such as amine dissipate and disappear along with the absorber discharge gas (second gas) and the regenerator discharge gas (third gas) and a problem that the absorbing liquid components are denatured into chemical components that cannot selectively capture the carbon dioxide due to oxygen deterioration or heating deterioration. In this case, due to a reduction in absorption performance of the absorbing liquid, the carbon dioxide capturing efficiency in the carbon dioxide capturing system decreases. Therefore, in the present embodiment, the processing in steps S8 to S10 copes with such long-term and continuous process fluctuations and maintains the flow rate of the carbon dioxide discharged from the regenerator 5.

As described above, the controller 17, when detecting that the flow rate of the carbon dioxide gas (third gas) discharged from the regenerator 5 is equal to or less than "L" (step S5), determines whether the steam flow rate of the reboiler 6 is less than the upper limit "HF" (step S6). Further, the controller 17, when determining that the steam flow rate of the reboiler 6 is equal to or greater than the upper limit "HF", receives the measurement value of the liquid level of the rich liquid accumulated in the liquid reservoir 2b of the absorber 2 (hereinafter, referred to as "liquid level of the absorber 2") from the liquid level gauge 16, and determines whether the measurement value is higher than a lower limit "P" (step S8).

The controller 17, when detecting that the liquid level of the absorber 2 does not deviate from the lower limit "P", namely, is higher than the lower limit "P" (step S8), lowers the set value ("SV" value) of the liquid level of the absorber 2 by "X3" from the present set value (step S9). As a result, the carbon dioxide capturing system operates in such a way as to lower the liquid level of the absorber 2. Accordingly, the liquid level of the absorber 2 decreases and the measurement value of the liquid level gauge 16 decreases correspondingly. Here, until the determination in step S1 is performed again after the change of the set value of the liquid level of the absorber 2 in step S9, a predetermined holding time is provided (step S4). The details of step S4 are as described above. The condition in step S8 is not limited to "greater than "P"" and may be replaced by "equal to or greater than "P"". Further, the value of "X3" may be a constant value or a variable value.

In the present embodiment, the liquid level of the lean liquid in the liquid reservoir 5b of the regenerator 5 (hereinafter, referred to as "liquid level of the regenerator 5") can be held constant by controlling the rich liquid flow rate or the lean liquid flow rate in the carbon dioxide capturing system. On the other hand, the liquid level of the absorber 2 of the present embodiment can be varied to buffer the process fluctuations. However, to maintain the total amount of the lean liquid and the rich liquid held in the whole carbon dioxide capturing system, the liquid level of the absorber 2 of the present embodiment is maintained by discarding the condensed water of the absorber discharge gas (second gas) and the regenerator discharge gas (third gas) to the outside the system or by introducing pure water from the outside the system, so that the liquid level is within a certain setting range. For example, the condensed water discharged from the gas-liquid separator 12 is discarded outside the system via the three-way valve 14.

Therefore, when the set value of the liquid level of the absorber 2 decreases, the liquid level of the absorber 2 decreases and the total amount of the lean liquid and the rich liquid held in the carbon dioxide capturing system decreases. Examples of the method for lowering the liquid level of the absorber 2 include a method for discarding (draining) condensed water generated by cooling the regenerator discharge gas (third gas) without returning the water to the regenerator 5, a method for discarding (draining) condensed water generated by cooling the absorber discharge gas (second gas) without returning the water to the absorber 2, and a method for discarding (draining) condensed water generated by cooling the process exhaust gas (first gas) flowing in the process exhaust gas line 1 without introducing the water into the absorber 2. The controller 17, when the set value of the liquid level of the absorber 2 decreases, can lower the liquid level of the absorber 2 by discarding the condensed water according to any one of these methods. In the present embodiment, any method can be used to control the liquid level of the absorber 2.

In the present embodiment, when the total amount of the lean liquid and the rich liquid held in the carbon dioxide capturing system decreases by step S9, only the water is substantially discarded from the absorbing liquid held in the carbon dioxide capturing system. Accordingly, the concentration of the water held in the absorbing liquid decreases, and the concentration of the absorbing liquid component held in the absorbing liquid increases. As a result, the concentration of the effective absorbing liquid component in the absorbing liquid is restored. In the carbon dioxide capturing system, there is a proportional relation between the concentration of the absorbing liquid component and the capturing efficiency. If the concentration of the absorbing liquid component is different from an optimum concentration, the capturing efficiency decreases. Therefore, bringing the concentration of the absorbing liquid component close to the optimum concentration can restore the carbon dioxide capturing efficiency in the carbon dioxide capturing system to desirable efficiency again.

It is not desirable to endlessly lower the liquid level of the absorber 2 by step S9 from the viewpoint of controllability of the liquid level and protection of the pump. The lower limit "P" in step S8 is provided to prevent the liquid level of the absorber 2 from being lowered excessively. Accordingly, the controller 17, when detecting that the liquid level of the absorber 2 deviates from the lower limit "P", namely, is equal to or less than the lower limit "P" (step S10), does not perform the processing in step S9. Here, until the determination in step S1 is performed again after the determination in step S10, a predetermined holding time is provided (step S4). The details of step S4 are as described above. The condition in step S10 is not limited to "equal to or less than "P"" and may be replaced by "less than "P"".

The controller 17 of the present embodiment, when the determination result is "YES" in step S10, may urge a user of the carbon dioxide capturing system to replace the absorbing liquid entirely or partly, or add absorbing liquid components to the absorbing liquid. For example, the controller 17 may transmit a message urging the total replacement of the absorbing liquid to a computer. Such a message may be transmitted before the determination result is "YES" in step S10, for example, when the difference between the liquid level of the absorber 2 and the lower limit "P" becomes smaller than a threshold. In addition, the controller 17 of the present embodiment, if the determination result in step S10 is "YES", may stop the operation of the carbon dioxide capturing system instead of returning step S4.

In the present embodiment, the total amount of the lean liquid and the rich liquid held is decreased by measuring the liquid level of the absorber 2 and lowering the liquid level of the absorber 2. However, the total amount of the lean liquid and the rich liquid held may be decreased by measuring the liquid level of any place other than the absorber 2 and lowering the liquid level of any place other than the absorber 2. Examples of such a place include the regenerator 5 and the above-described absorbing liquid buffering tank. Further, the total amount of the lean liquid and the rich liquid held may be decreased by measuring and lowering both the liquid level of the absorber 2 and the liquid level of the regenerator 5.

Further, in step S3, the quantity of heat energy supplied to the regenerator 5 may be decreased by a method other than the method for decreasing the flow rate of the high-temperature steam supplied to the reboiler 6. For example, the quantity of heat energy supplied to the regenerator 5 may be decreased by lowering the temperature of the high-temperature steam supplied the reboiler 6. Further, when the regenerator 5 includes an electric heater as a heater, the quantity of heat energy supplied to the regenerator 5 may be decreased by decreasing the power of the electric heater or by shortening the operating time of the electric heater.

Similarly, in step S7, the quantity of heat energy supplied to the regenerator 5 may be increased by a method other than the method for increasing the flow rate of the high-temperature steam supplied to the reboiler 6. For example, the quantity of heat energy supplied to the regenerator 5 may be increased by raising the temperature of the high-temperature steam supplied to the reboiler 6. Further, when the regenerator 5 includes an electric heater as a heater, the quantity of heat energy supplied to the regenerator 5 may be increased by increasing the power of the electric heater or by elongating the operating time of the electric heater.

As described above, the controller 17 of the present embodiment controls the quantity of heat energy supplied to the regenerator 5 based on the flow rate of the regenerator discharge gas (third gas) measured by the flowmeter 15. Further, the controller 17 of the present embodiment controls the total amount of the lean liquid and the rich liquid held in the carbon dioxide capturing system based on the liquid level of the rich liquid measured by the liquid level gauge 16. Accordingly, it is possible to suppress short-term fluctuations in the carbon dioxide gas amount by controlling the heat quantity. Further, it is possible to suppress long-term deterioration in performance of the carbon dioxide capturing system by controlling the total amount of the lean liquid and the rich liquid held. Therefore, according to the present embodiment, the carbon dioxide capturing amount by the carbon dioxide capturing system can be stabilized.

Second Embodiment

Figure 3:
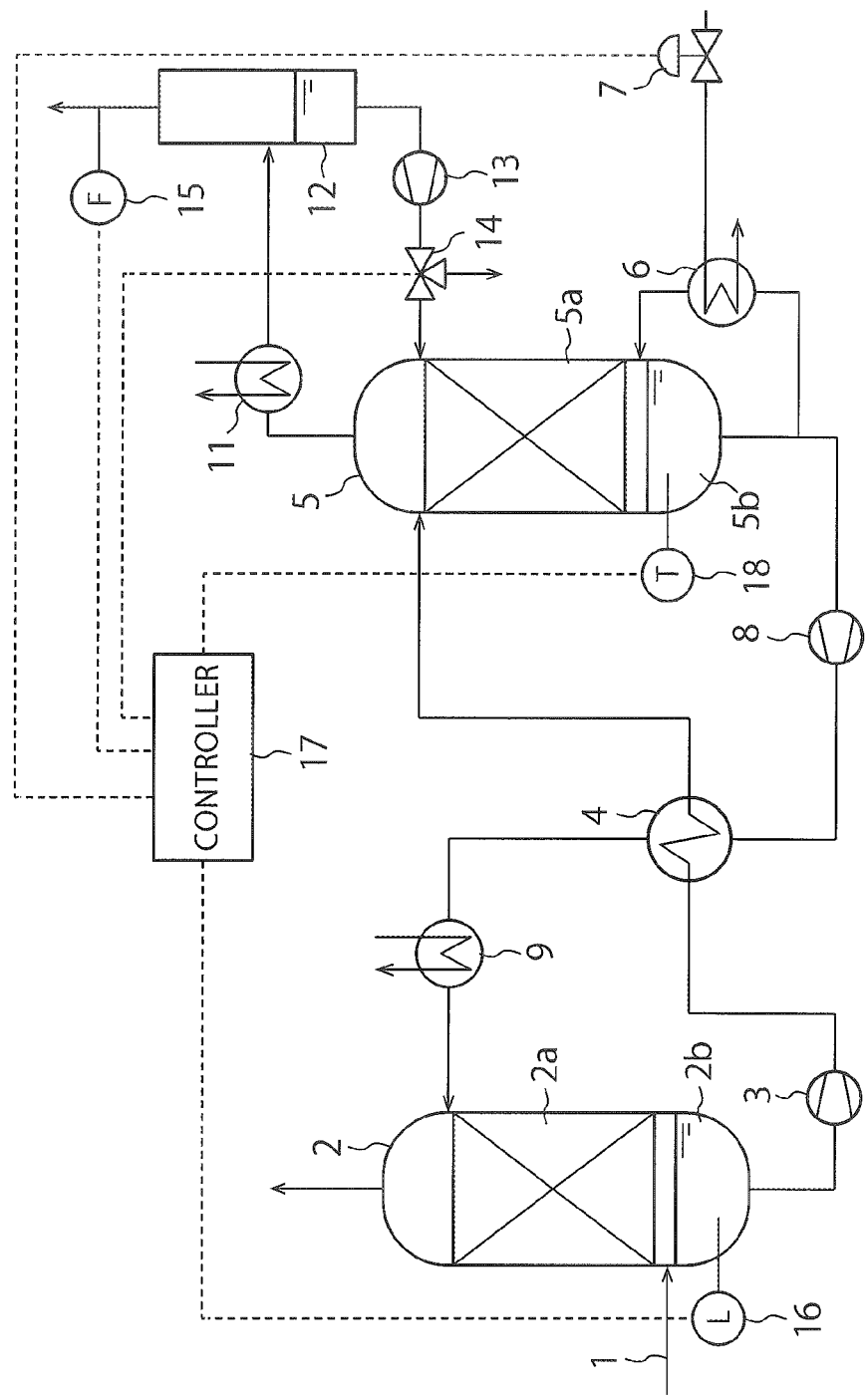
FIG. 3 is a schematic diagram illustrating a configuration of a carbon dioxide capturing system of a second embodiment.

FIG. 3 is a schematic diagram illustrating a configuration of a carbon dioxide capturing system of a second embodiment.

The carbon dioxide capturing system illustrated in FIG. 3 includes a thermometer 18 in addition to the components illustrated in FIG. 1. The thermometer 18 is provided in the regenerator 5 and measures the temperature of the regenerator 5 and outputs a measurement value to the controller 17. The thermometer 18 of the present embodiment is provided in the liquid reservoir 5b of the regenerator 5, and measures the temperature of the lean liquid in the liquid reservoir 5b.

Figure 4:
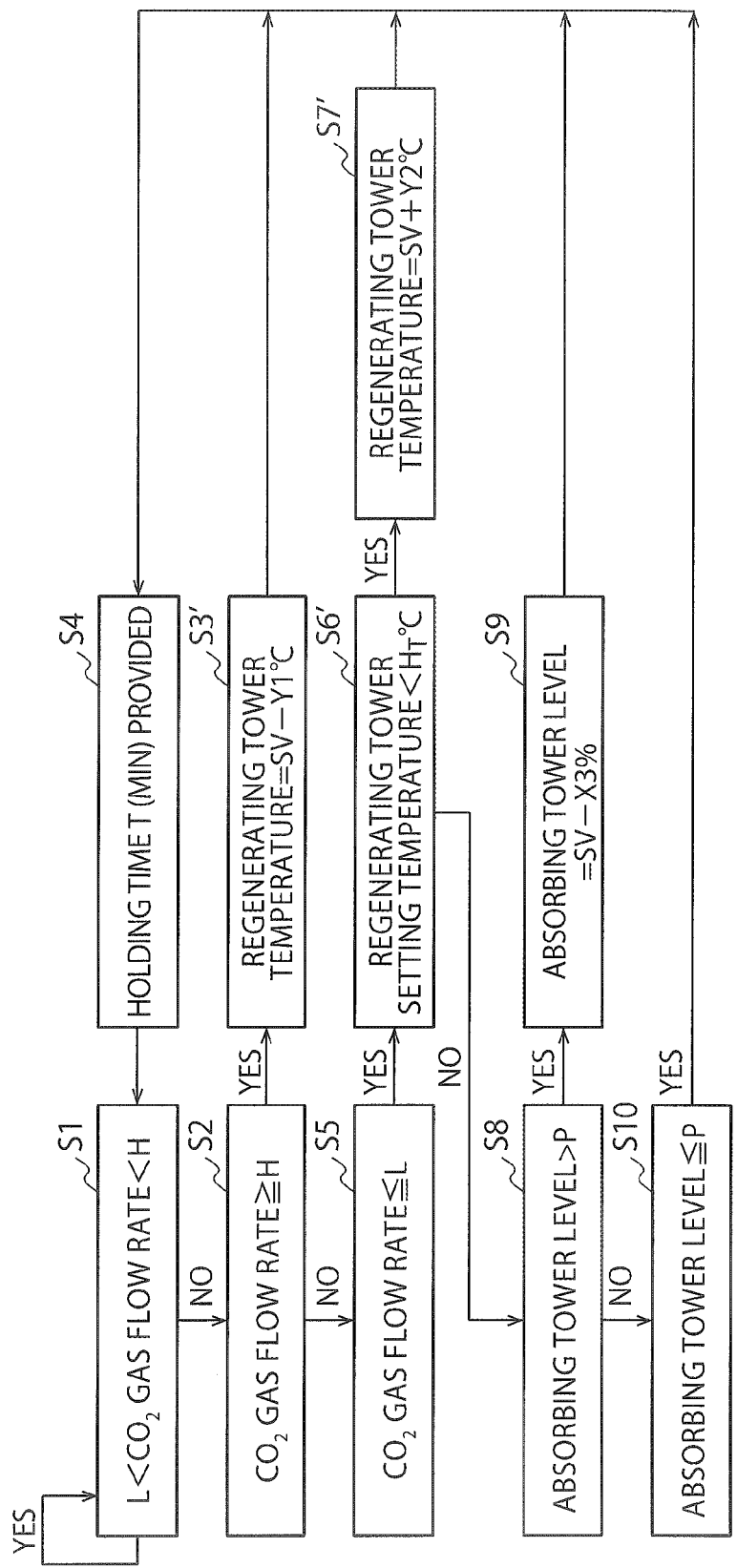
FIG. 4 is a diagram illustrating an operation of the carbon dioxide capturing system of the second embodiment.

FIG. 4 is a diagram illustrating an operation of the carbon dioxide capturing system of the second embodiment. FIG. 4 illustrates an exemplary flow of control by the controller 17 of the second embodiment. In FIG. 4, steps S3, S6, and S7 are replaced with steps S3', S6', and S7', respectively.

First, the controller 17 receives, from the flowmeter 15, the measurement value of the flow rate of the carbon dioxide gas (third gas) discharged from the regenerator 5, and determines whether the measurement value is within a specified range (step S1). Here, "L" represents a lower limit of the specified range and "H" represents an upper limit of the specified range. The controller 17 determines whether the measurement value is greater than "L" and less than "H".

When the flow rate of the carbon dioxide gas (third gas) deviates from this range, the temperature of the regenerator 5, specifically, the temperature of the lean liquid in the liquid reservoir 5b is adjusted. The temperature of the regenerator 5 can be adjusted by controlling the heat source of the regenerator 5, for example, by controlling the steam flow rate or the steam temperature of the reboiler 6. As described above, the steam flow rate is the flow rate of the high-temperature steam supplied from the steam flow control valve 7 to the reboiler 6. Further, the steam temperature is the temperature of the high-temperature steam supplied from the steam flow control valve 7 to the reboiler 6. When the heat source of the regenerator 5 is an electric heater, the temperature of the regenerator 5 is adjustable by controlling the power or the operating time of the electric heater.

The controller 17, when detecting that the flow rate of the carbon dioxide gas (third gas) is equal to or greater than "H" (step S2), decreases the set value ("SV" value) of the temperature of the regenerator 5 by "Y1" from the present set value (step S3'). As a result, the opening degree of the steam flow control valve 7 decreases so that the temperature of the regenerator 5 decreases, and the flow rate of the high-temperature steam supplied from the steam flow control valve 7 to the reboiler 6 decreases. The quantity of heat energy supplied to the regenerator 5 per unit time decreases. When the flow rate of the high-temperature steam decreases, the temperature of the regenerator 5 decreases, and the measurement value of a thermometer 17 decreases. Accordingly, the amount of the carbon dioxide released from the regenerator 5 decreases. As a result, the flow rate of the carbon dioxide gas (third gas) from the regenerator 5 decreases, and the flow rate changes to a value within the above-described range from "L" to "H". The value of "Y1" may be a constant value or a variable value.

On the other hand, the controller 17, when detecting that the flow rate of the carbon dioxide gas (third gas) is equal to or less than "L" (step S5), if the determination result in step S6' is "YES", increases the set value ("SV" value) of the temperature of the regenerator 5 by "Y2" from the present set value (step S7'). As a result, the opening degree of the steam flow control valve 7 increases so that the temperature of the regenerator 5 increases. Thereby, the flow rate of the high-temperature steam supplied from the steam flow control valve 7 to the reboiler 6 increases, and the quantity of heat energy supplied to the regenerator 5 per unit time increases. When the flow rate of the high-temperature steam increases, the temperature of the regenerator 5 rises and the measurement value of the thermometer 17 also rises. Accordingly, the amount of the carbon dioxide released from the regenerator 5 increases. As a result, the flow rate of the carbon dioxide gas (third gas) from the regenerator 5 increases, and the flow rate changes to a value within the above-described range from "L" to "H". The value of "Y2" may be a constant value or a variable value.

The controller 17 receives, from the thermometer 18, the measurement value of the temperature of the regenerator 5 and controls the opening degree of the steam flow control valve 7 (that is, the steam flow rate of the reboiler 6) so that the measurement value of the temperature of the regenerator 5 comes close to the set value of the temperature of the regenerator 5. Accordingly, when the set value of the temperature of the regenerator 5 changes in step S3' or step S7', the opening degree of the steam flow control valve 7 changes and the measurement value of the temperature of the regenerator 5 changes. In step S3' or step S7', the steam temperature of the reboiler 6 may be changed, instead of changing the steam flow rate of the reboiler 6. Alternatively, the power or the operating time of the electric heater may be changed. Further, in step S3' or step S7', two or more of these physical quantities may be changed.

As described above, in step S7', it is not desirable to increase the steam flow rate supplied to the reboiler 6 endlessly because of the ability of the steam supplying source that supplies the high-temperature steam to the reboiler 6 or the problem of upper limit in design of the carbon dioxide capturing system. That is, it is not desirable to raise the temperature of the regenerator 5 endlessly. Therefore, in step S6', it is determined whether the set value of the temperature of the regenerator 5 is less than the upper limit "HT". When the set value of the temperature of the regenerator 5 is lower than the upper limit "HT", the processing proceeds to step S7'. When the set value of the temperature of the regenerator 5 is equal to or greater than the upper limit "HT", the processing proceeds to step S8. The condition in step S6' is not limited to "less than "HT"" and may be replaced by "equal to or less than "HT"". Further, in step S6', it may be determined whether the measurement value of the temperature of the regenerator 5 is less than the upper limit "HT".

In the present embodiment, the temperature of the regenerator 5 is set to the temperature of the lean liquid in the liquid reservoir 5b, but may be set to another temperature. For example, the temperature of the regenerator 5 may be the temperature of a space between the packed bed 5a and the liquid reservoir 5b in the regenerator 5 or the temperature of the lean liquid near the absorbing liquid discharge port of the regenerator 5.

As described above, according to the present embodiment, it is possible to suppress short-term fluctuations in the flow rate of the carbon dioxide gas (third gas) by controlling the temperature of the regenerator 5. Further, it is possible to suppress long-term deterioration in performance of the carbon dioxide capturing system by controlling the total amount of the lean liquid and the rich liquid held. Therefore, the carbon dioxide capturing amount by the carbon dioxide capturing system can be stabilized.

Third Embodiment

Figure 5:
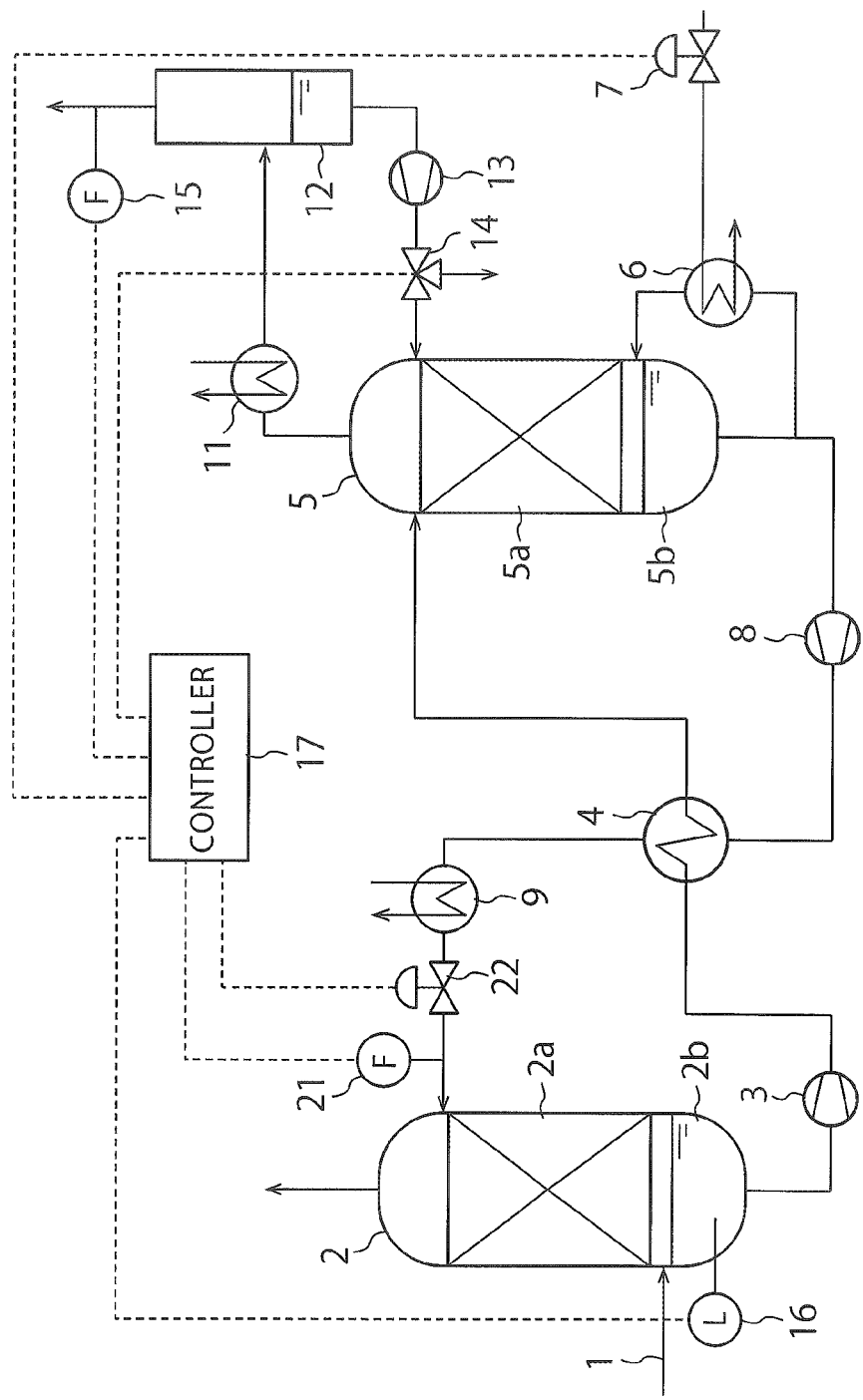
FIG. 5 is a schematic diagram illustrating a configuration of a carbon dioxide capturing system of a third embodiment.

FIG. 5 is a schematic diagram illustrating a configuration of a carbon dioxide capturing system of a third embodiment.

The carbon dioxide capturing system illustrated in FIG. 5 includes, in addition to the components illustrated in FIG. 1, a flowmeter 21 and a flow control valve 22. The flowmeter 21 measures the flow rate of the lean liquid flowing between the absorber 2 and the regenerator 5, and outputs a measurement value to the controller 17. The flow control valve 22 is provided in a flow path between the absorber 2 and the regenerator 5, and is used to adjust the flow rate of the lean liquid flowing in the flow path.

The flowmeter 21 of the present embodiment is provided in a flow path extending from the lean liquid cooler 9 to the absorber 2, and measures the flow rate of the lean liquid flowing in this flow path. Further, the flow control valve 22 of the present embodiment is provided in a flow path extending from the lean liquid cooler 9 to the absorber 2 via the flowmeter 21, and is used to adjust the flow rate of the lean liquid flowing in this flow path.

Figure 6:
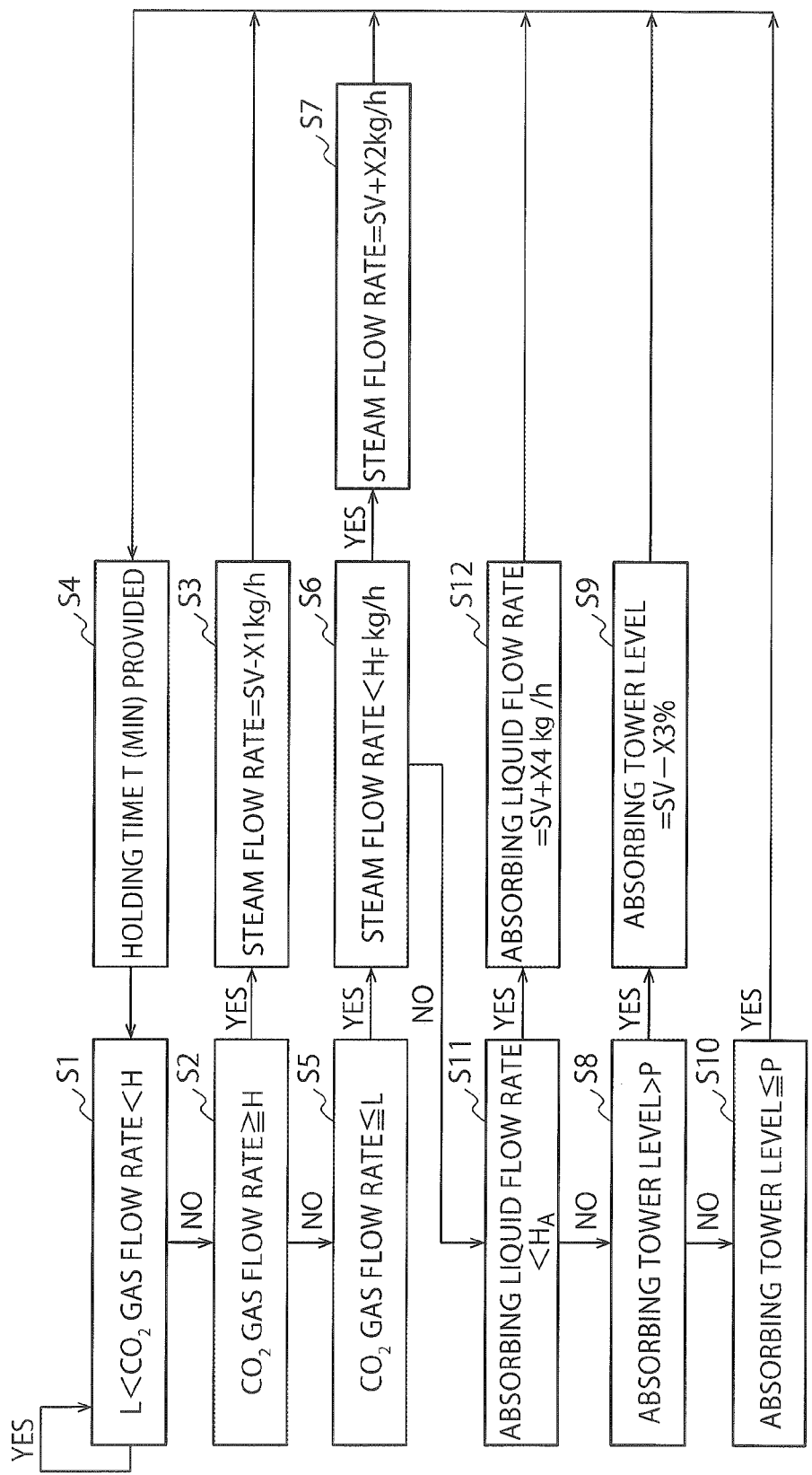
FIG. 6 is a diagram illustrating an operation of the carbon dioxide capturing system of the third embodiment.

FIG. 6 is a diagram illustrating an operation of the carbon dioxide capturing system of the third embodiment. FIG. 6 illustrates an exemplary flow of control by the controller 17 of the third embodiment. The control flow illustrated in FIG. 6 includes, in addition to the steps illustrated in FIG. 2, steps S11 and S12 between steps S6 and S8.

As described above, according to steps S1 to S7, short-term and sudden process fluctuations in which the flow rate of the carbon dioxide gas (third gas) from the regenerator cannot be maintained in the specified range can be suppressed, and the flow rate of the carbon dioxide from the regenerator 5 can be maintained stably.

On the other hand, the lean liquid of the present embodiment encounters a problem that absorbing liquid components such as amine dissipate and disappear along with the absorber discharge gas (second gas) and the regenerator discharge gas (third gas) and a problem that the absorbing liquid components are denatured into chemical components that cannot selectively capture the carbon dioxide due to oxygen deterioration or heating deterioration. In this case, due to a reduction in absorption performance of the lean liquid, the carbon dioxide capturing efficiency in the carbon dioxide capturing system decreases. Therefore, in the present embodiment, the processing in steps S8 to S12 copes with such long-term and continuous process fluctuations and maintains the flow rate of the carbon dioxide gas (third gas) discharged from the regenerator 5.

The controller 17, when detecting that the flow rate of the carbon dioxide gas (third gas) discharged from the regenerator 5 is equal to or less than "L" (step S5), determines whether the steam flow rate of the reboiler 6 is less than the upper limit "HF" (step S6). Then, the controller 17, when determining that the steam flow rate of the reboiler 6 is equal to or greater than the upper limit "HF", receives, from the flowmeter 21, the measurement value of the flow rate of the lean liquid flowing between the absorber 2 and the regenerator 5 and determines whether the measurement value is less than an upper limit "HA" (step S11).

The controller 17, when detecting that the flow rate of the lean liquid does not deviate from the upper limit "HA,"

namely, is less than the upper limit "HA" (step S11), increases the set value ("SV" value) of the flow rate of the lean liquid by "X4" from the present set value (step S12). As a result, when the controller 17 increases the opening degree of the flow control valve 22 so that the flow rate of the lean liquid increases, the flow rate of the lean liquid flowing between the absorber 2 and the regenerator 5 increases. Here, until the determination in step S1 is performed again after the change of the set value of the flow rate of the lean liquid in step S12, a predetermined holding time is provided (step S4). The details of step S4 are as described above. The condition in step S11 is not limited to "less than "HA"" and may be replaced by "equal to or less than "HA"". Further, the value of "X4" may be a constant value or a variable value.

As mentioned above, the controller 17 of the present embodiment, when the flow rate of the carbon dioxide gas (third gas) is smaller but the steam flow rate of the reboiler 6 is larger (steps S5 and S6), increases the flow rate of the lean liquid flowing between the absorber 2 and the regenerator 5 (hereinafter, referred to as "lean liquid circulation flow rate") (step S12). When the lean liquid circulation flow rate increases, the amount of lean liquid that can react with the carbon dioxide contained in the process exhaust gas (first gas) increases in the absorber 2. Therefore, the amount of capturable carbon dioxide can be increased. Further, when the lean liquid circulation flow rate increases, the flow rate of the rich liquid supplied to the regenerator 5 increases and the amount of regenerated carbon dioxide increases. Accordingly, it is possible to restore the carbon dioxide capturing amount decreased by the deterioration of the lean liquid or the like.

It is not desirable to endlessly increase the lean liquid circulation flow rate by step S12 from the viewpoint of transportation capacity of the pipe and protection of the pump. The upper limit "HA" in step S11 is provided to prevent the lean liquid circulation flow rate from excessively increasing. Accordingly, when the controller 17 detects that the lean liquid circulation flow rate deviates from the upper limit "HA", namely, is equal to or greater than the upper limit "HA" (step S11), the processing proceeds to step S8 to adjust the liquid level of the absorber 2.

As described above, the controller 17 of the present embodiment can restore the carbon dioxide capturing amount by performing first processing for increasing the lean liquid circulation flow rate and second processing for lowering the liquid level of the absorber 2. As a result, long-term deterioration in performance of the carbon dioxide capturing system can be suppressed.

Like the second embodiment, steps S3, S6, and S7 of the present embodiment may be replaced by steps S3', S6', and S7', respectively. This is the same in fourth and fifth embodiments described below.

Fourth Embodiment

Figure 7:
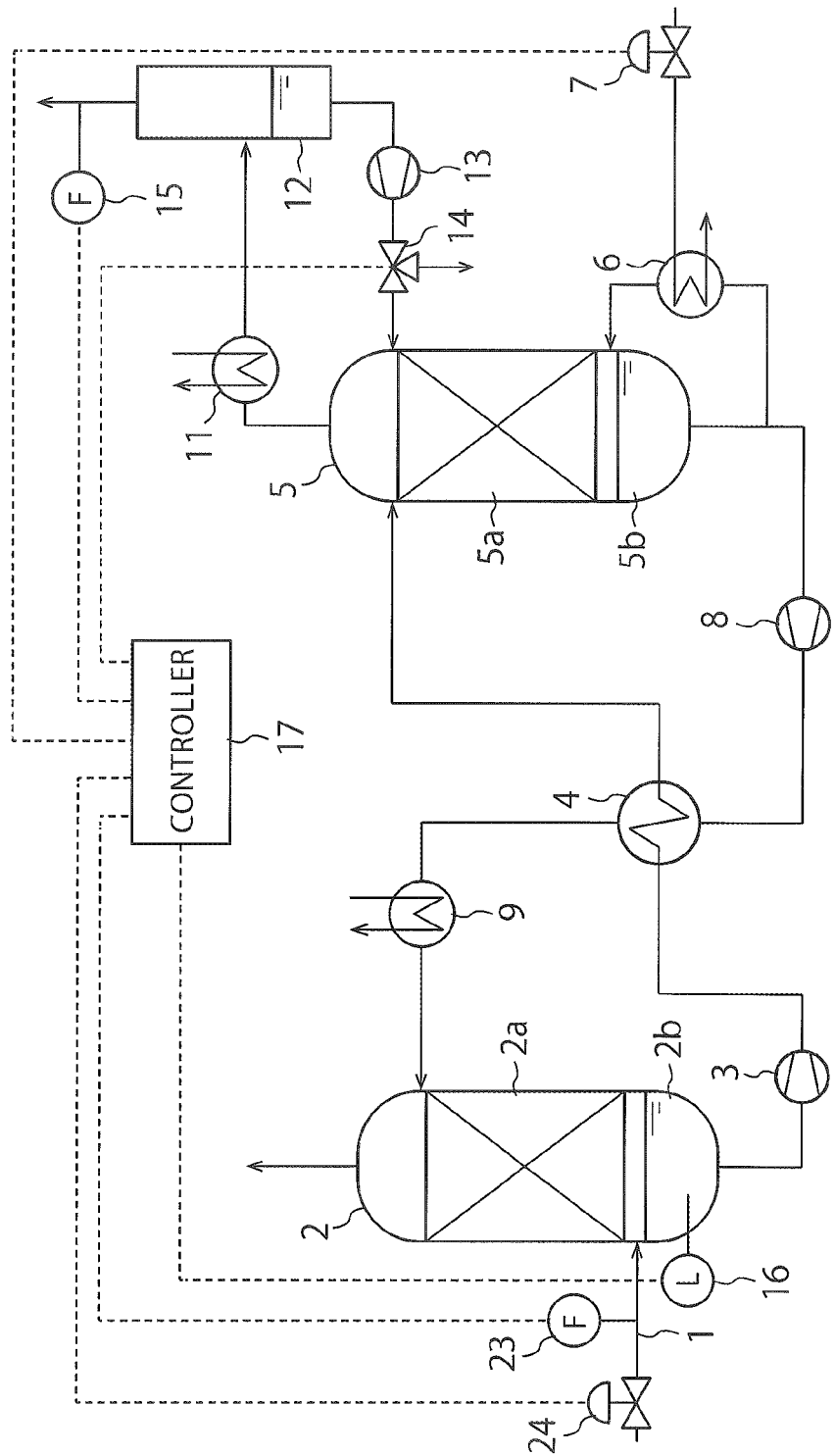
FIG. 7 is a schematic diagram illustrating a configuration of a carbon dioxide capturing system of a fourth embodiment.

FIG. 7 is a schematic diagram illustrating a configuration of a carbon dioxide capturing system of a fourth embodiment.

The carbon dioxide capturing system illustrated in FIG. 7 includes, in addition to the components illustrated in FIG. 1, a flowmeter 23 and a flow control valve 24. The flowmeter 23 measures the flow rate of process exhaust gas (first gas) before being introduced into the absorber 2 and outputs a measurement value to the controller 17. The flowmeter 23 of the present embodiment is provided in the process exhaust gas line 1, and measures the flow rate of the process exhaust gas (first gas) flowing in the process exhaust gas line 1. The flow control valve 24 is provided in the process exhaust gas line 1, and is used to adjust the flow rate of the process exhaust gas (first gas) flowing in the process exhaust gas line 1.

Figure 8:
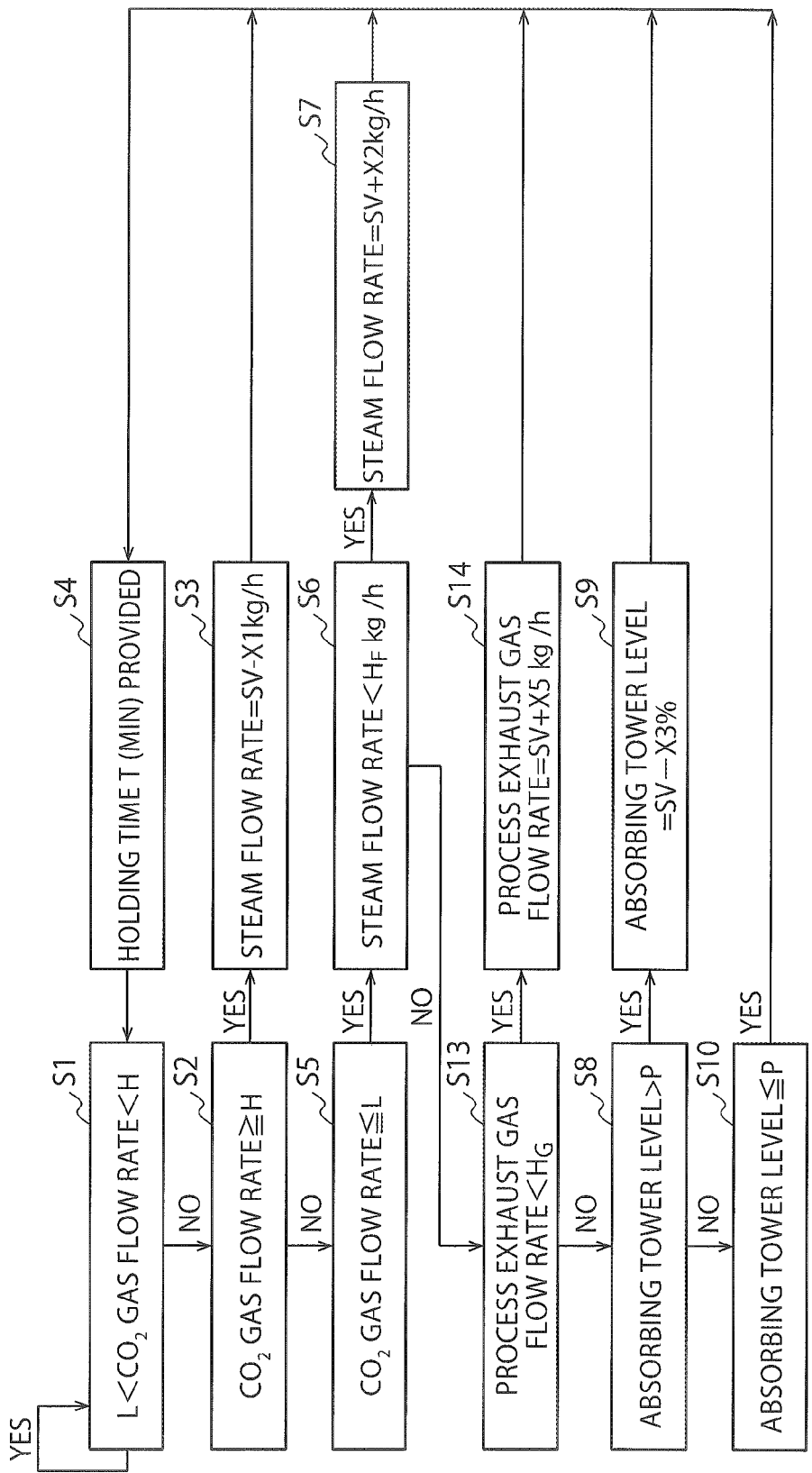
FIG. 8 is a diagram illustrating an operation of the carbon dioxide capturing system of the fourth embodiment.

FIG. 8 is a diagram illustrating an operation of the carbon dioxide capturing system of the fourth embodiment. FIG. 8 illustrates an exemplary flow of control by the controller 17 of the fourth embodiment. The control flow illustrated in FIG. 8 includes, in addition to the steps illustrated in FIG. 2, steps S13 and S14 between steps S6 and S8.

As described above, according to steps S1 to S7, short-term and sudden process fluctuations in which the flow rate of the carbon dioxide gas (third gas) from the regenerator 5 cannot be maintained in the specified range can be suppressed, and the flow rate of the carbon dioxide from the regenerator 5 can be maintained stably.

On the other hand, the absorbing liquid of the present embodiment encounters a problem that absorbing liquid components such as amine dissipate and disappear along with the absorber discharge gas (second gas) and the regenerator discharge gas (third gas) and a problem that the absorbing liquid components are denatured into chemical components that cannot selectively capture the carbon dioxide due to oxygen deterioration or heating deterioration. In this case, due to a reduction in absorption performance of the absorbing liquid, the carbon dioxide capturing efficiency in the carbon dioxide capturing system decreases. Therefore, in the present embodiment, the processing in steps S8 to S10, S13, and S14 copes with such long-term and continuous process fluctuations and maintains the flow rate of the carbon dioxide gas (third gas) discharged from the regenerator 5.

The controller 17, when detecting that the flow rate of the carbon dioxide gas (third gas) discharged from the regenerator 5 is equal to or less than "L" (step S5), determines whether the steam flow rate of the reboiler 6 is less than the upper limit "HF" (step S6). Then, the controller 17, when determining that the steam flow rate of the reboiler 6 is equal to or greater than the upper limit "HF", receives, from the flowmeter 23, the measurement value of the flow rate of the process exhaust gas flowing in the process exhaust gas line 1, and determines whether the measurement value is less than an upper limit "HG" (step S13).

The controller 17, when detecting that the flow rate of the process exhaust gas (first gas) does not deviate from the upper limit "HG", namely, is less than the upper limit "HG" (step S13), increases the set value of the flow rate of the process exhaust gas (first gas) ("SV" value) by "X5" from the present set value (step S14). As a result, when the controller 17 increases the opening degree of the flow control valve 24 so that the flow rate of the process exhaust gas (first gas) increases, the flow rate of the process exhaust gas (first gas) flowing in the process exhaust gas line 1 increases. Here, until the determination in step S1 is performed again after the change of the set value of the flow rate of the process exhaust gas (first gas) in step S14, a predetermined holding time is provided (step S4). The details of step S4 are as described above. The condition in step S13 is not limited to "less than "HG"" and may be replaced by "equal to or less than "HG"". Further, the value of "X5" may be a constant value or a variable value.

As mentioned above, when the flow rate of the carbon dioxide gas (third gas) is smaller but the steam flow rate of the reboiler 6 is larger (steps S5 and S6), the controller 17 of the present embodiment increases the flow rate of the process exhaust gas (first gas) flowing in the process exhaust gas line 1 (step S13). When the flow rate of the process exhaust gas (first gas) increases, the amount of carbon dioxide that can react with the lean liquid increases in the absorber 2. Therefore, the amount of capturable carbon dioxide can be increased. Further, when the flow rate of the process exhaust gas (first gas) increases, the amount of carbon dioxide in the rich liquid supplied to the regenerator 5 increases and the amount of regenerated carbon dioxide increases. Accordingly, it is possible to restore the carbon dioxide capturing amount decreased by the deterioration of the lean liquid or the like.

It is not desirable to endlessly increase the flow rate of the process exhaust gas (first gas) by step S14 from the viewpoint of transportation capacity of the pipe and protection of a blower. The upper limit "HG" in step S13 is provided to prevent the flow rate of the process exhaust gas (first gas) from excessively increasing. Accordingly, when the controller 17 detects that the flow rate of the process exhaust gas (first gas) deviates from the upper limit "HG", namely, is equal to or greater than the upper limit "HG" (step S13), the processing proceeds to step S8 to adjust the liquid level of the absorber 2.

As described above, the controller 17 of the present embodiment can restore the carbon dioxide capturing amount by performing first processing for increasing the flow rate of the process exhaust gas (first gas) and second processing for lowering the liquid level of the absorber 2. As a result, long-term deterioration in performance of the carbon dioxide capturing system can be suppressed.

Fifth Embodiment

Figure 9:
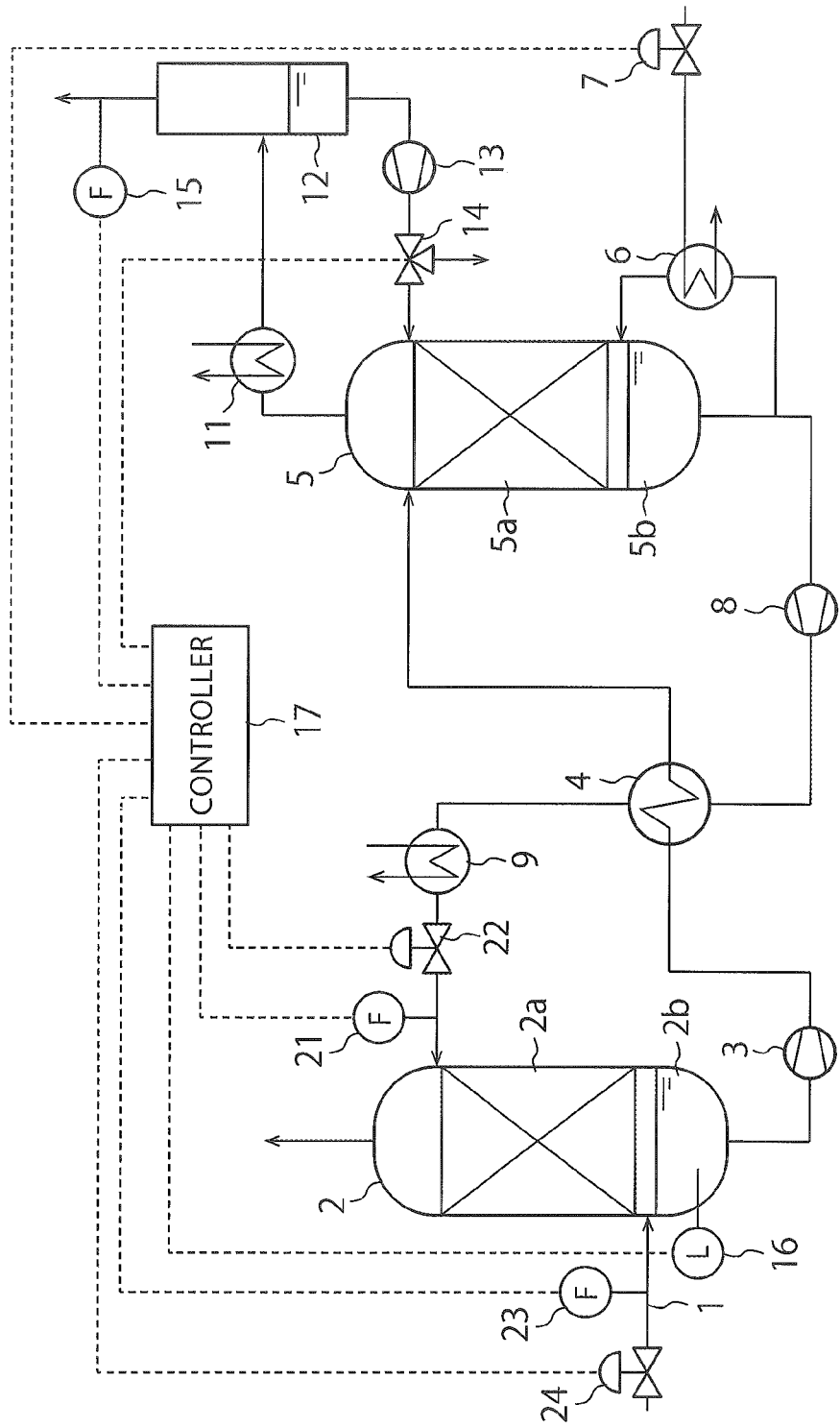
FIG. 9 is a schematic diagram illustrating a configuration of a carbon dioxide capturing system of a fifth embodiment.

FIG. 9 is a schematic diagram illustrating a configuration of a carbon dioxide capturing system of a fifth embodiment.

The carbon dioxide capturing system illustrated in FIG. 9 includes, in addition to the components illustrated in FIG. 1, a flowmeter 21 and a flow control valve 22 that are similar to those of the third embodiment and a flowmeter 23 and a flow control valve 24 that are similar to those of the fourth embodiment.

Figure 10:
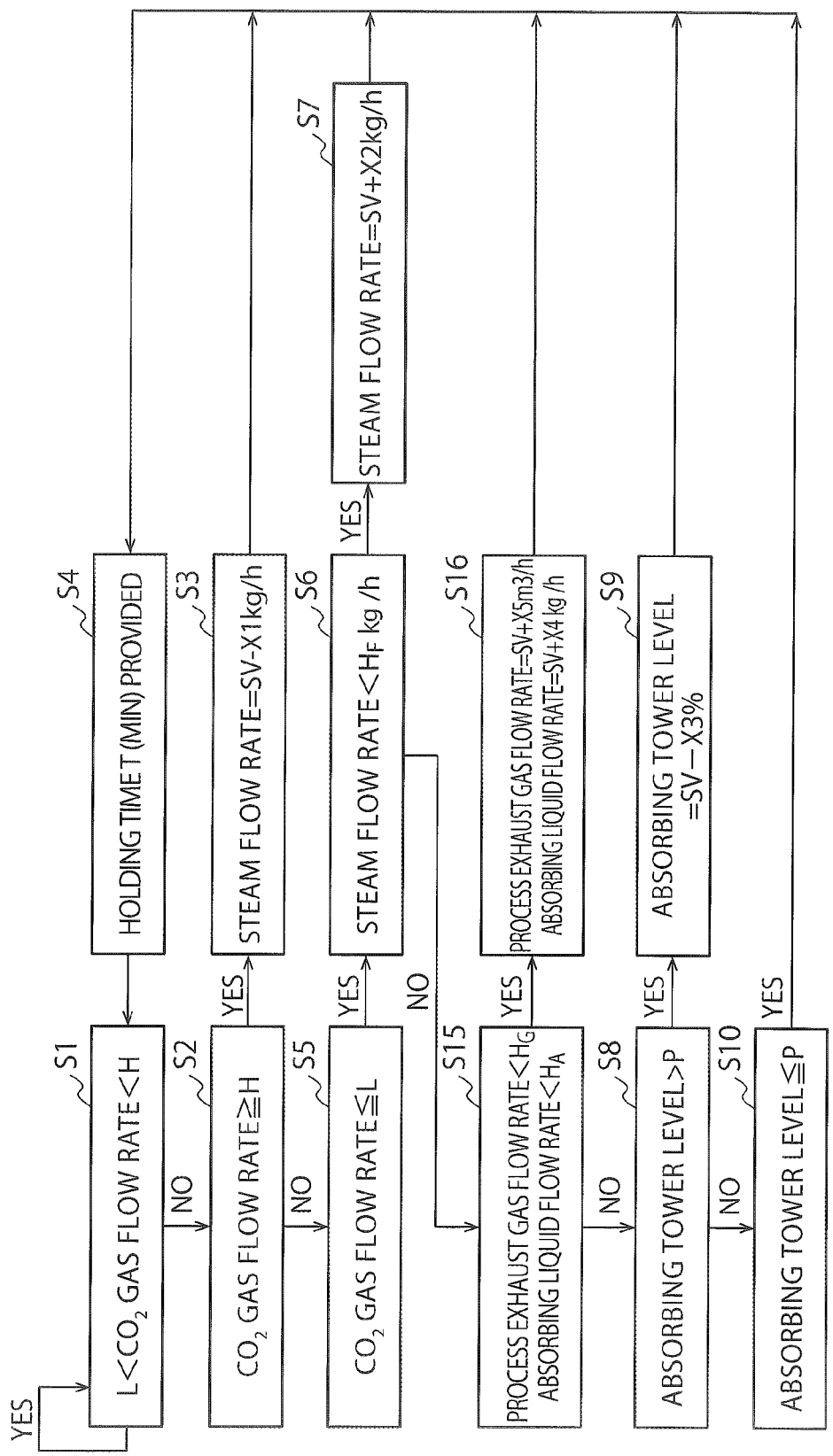
FIG. 10 is a diagram illustrating an operation of the carbon dioxide capturing system of the fifth embodiment.

FIG. 10 is a diagram illustrating an operation of the carbon dioxide capturing system of the fifth embodiment. FIG. 10 illustrates an exemplary flow of control by the controller 17 of the fifth embodiment. The control flow illustrated in FIG. 10 includes, in addition to the steps illustrated in FIG. 2, steps S15 and S16 between steps S6 and S8. Step S15 is a step comparable to a combination of steps S11 and S13, and step S16 is a step comparable to a combination of steps S12 and S14.

The controller 17, when detecting that the flow rate of the carbon dioxide gas (third gas) discharged from the regenerator 5 is equal to or less than "L" (step S5), determines whether the steam flow rate of the reboiler 6 is less than the upper limit "HF" (step S6). Then, the controller 17, when determining that the steam flow rate of the reboiler 6 is equal to or greater than the upper limit "HF", receives, from the flowmeter 21, the measurement value of the flow rate of the lean liquid flowing between the absorber 2 and the regenerator 5, and determines whether the measurement value is less than the upper limit "HA" (step S15). In addition, the controller 17 receives, from the flowmeter 23, the measurement value of the flow rate of the process exhaust gas flowing in the process exhaust gas line 1, and determines whether the measurement value is less than the upper limit "HG" (step S15).

The controller 17, when detecting that the flow rate of the lean liquid is less than the upper limit "HA" and the flow rate of the process exhaust gas (first gas) is less than the upper limit "HG" (step S15), increases the set value ("SV" value) of the flow rate of the lean liquid by "X4" from the present set value, and increases the set value of the flow rate of the process exhaust gas (first gas) ("SV" value) by "X5" from the present set value (step S16). As a result, when the controller 17 increases the opening degrees of the flow control valve 22 and the flow control valve 24, the flow rates of the lean liquid and the process exhaust gas (first gas) increase. Here, until the determination in step S1 is performed again after the change of the set value of the flow rate of the lean liquid in step S16, a predetermined holding time is provided (step S4). The details of step S4 are as described above.

It is not desirable to endlessly increase the flow rates of the lean liquid and the process exhaust gas (first gas) by step S16 from the viewpoint of transportation capacity of the pipe and protection of the blower. The upper limits "HA" and "HG" in step S15 are provided to prevent the flow rates of the lean liquid and the process exhaust gas (first gas) from excessively increasing. Accordingly, when the controller 17 detects that the flow rate of the lean liquid is equal to or greater than the upper limit "HA", and/or the flow rate of the process exhaust gas (first gas) is equal to or greater than the upper limit "HG" (step S15), the processing proceeds to step S8 to adjust the liquid level of the absorber 2.

As described above, the controller 17 of the present embodiment can restore the carbon dioxide capturing amount by performing first processing for increasing the flow rates of the lean liquid and the process exhaust gas (first gas) and second processing for lowering the liquid level of the absorber 2. As a result, long-term deterioration in performance of the carbon dioxide capturing system can be suppressed.

The controller 17 of the present embodiment may control the flow rate of the lean liquid and the flow rate of the process exhaust gas (first gas) in association with each other. For example, the controller 17 may control the flow rate of the lean liquid and the flow rate of the process exhaust gas (first gas) so that an "L/G" value, being a mass flow ratio of the flow rate of the lean liquid (L) to the flow rate of the process exhaust gas (first gas) (G), becomes constant. Further, the ratio of "X4" to "X5" may be set to be constant.

While certain embodiments have been described, these embodiments have been presented by way of example only, and are not intended to limit the scope of the inventions. Indeed, the novel systems and methods described herein may be embodied in a variety of other forms; furthermore, various omissions, substitutions and changes in the form of the systems and methods described herein may be made without departing from the spirit of the inventions. The accompanying claims and their equivalents are intended to cover such forms or modifications as would fall within the scope and spirit of the inventions.

The invention claimed is:

1. A carbon dioxide capturing system comprising:
   an absorber configured to absorb carbon dioxide from a first gas into a lean liquid, and configured to produce a rich liquid including the lean liquid having absorbed the carbon dioxide and a second gas including the first gas from which the carbon dioxide has been removed;
   a regenerator configured to separate a third gas including the carbon dioxide from the rich liquid flowing from the absorber, and configured to provide the lean liquid and the third gas;
   a flowmeter configured to measure a flow rate of the third gas;

a liquid level gauge provided in at least one of a lean liquid reservoir of the regenerator or a rich liquid reservoir of the absorber, and configured to measure a liquid level of at least one of the lean liquid in the lean liquid reservoir or the rich liquid in the rich liquid reservoir; and a controller configured to regulate a quantity of heat energy supplied to the regenerator based on the flow rate of the third gas, and configured to regulate a total amount of the lean liquid and the rich liquid in the carbon dioxide capturing system based on the liquid level, wherein the system further comprises a reboiler configured to supply the quantity of heat energy to the regenerator by using steam, or a heater configured to supply the quantity of heat energy to the regenerator by using electricity;

the controller is configured to regulate the quantity of heat energy by adjusting at least one of a flow rate or a temperature of the steam supplied to the reboiler, or by adjusting at least one of power or operating time of the heater;

the controller is configured to decrease the total amount of the lean liquid and the rich liquid by draining at least one of condensed water transformed from the first gas before the first gas flows into the absorber, condensed water transformed from the second gas, or condensed water transformed from the third gas, based on the liquid level.

2. The system of claim 1, wherein the controller is configured to regulate the quantity of heat energy when the flow rate of the third gas deviates from an upper limit or a lower limit that has been predetermined.

3. The system of claim 1, wherein the controller is configured to decrease the total amount of the lean liquid and the rich liquid when the quantity of heat energy deviates from an upper limit, and the liquid level is higher than a lower limit.

4. The system of claim 1, further comprising a thermometer configured to measure a temperature of the regenerator,
wherein the controller is configured to regulate the quantity of heat energy based on the temperature.

5. The system of claim 1, further comprising an absorbing liquid flowmeter configured to measure a flow rate of the lean liquid flowing between the absorber and the regenerator,
wherein the controller is configured to regulate the flow rate of the lean liquid based on the quantity of heat energy and the flow rate of the lean liquid.

6. The system of claim 5, wherein the controller is configured to increase the flow rate of the lean liquid flowing between the absorber and the regenerator, when the quantity of heat energy is equal to or larger than an upper limit and the flow rate of the lean liquid is equal to or smaller than an upper limit.

7. The system of claim 1, further comprising a gas flowmeter configured to measure a flow rate of the first gas before flowing into the absorber,
wherein the controller is configured to regulate the flow rate of the first gas based on the quantity of heat energy and the flow rate of the first gas.

8. The system of claim 7, wherein the controller is configured to increase the flow rate of the first gas when the quantity of heat energy is larger than an upper limit and the flow rate of the first gas is equal to or smaller than an upper limit.

9. A method of operating a carbon dioxide capturing system, comprising:
absorbing carbon dioxide from a first gas into a lean liquid, and producing a rich liquid including the lean liquid having absorbed the carbon dioxide and a second gas including the first gas from which the carbon dioxide has been removed;
separating a third gas including the carbon dioxide from the rich liquid and providing the lean liquid and the third gas;
measuring a flow rate of the third gas;
measuring a liquid level of at least one of the lean liquid in a lean liquid reservoir or the rich liquid in a rich liquid reservoir;
regulating a quantity of heat energy supplied to separate the third gas from the rich liquid based on the flow rate of the third gas; and
regulating a total amount of the lean liquid and the rich liquid in the carbon dioxide capturing system based on the liquid level,
wherein
the method further comprises preparing a reboiler configured to supply the quantity of heat energy by using steam, or a heater configured to supply the quantity of heat energy by using electricity;
the quantity of heat energy is regulated by adjusting at least one of a flow rate or a temperature of the steam supplied to the reboiler, or by adjusting at least one of power or operating time of the heater;
the regulating the total amount of the lean liquid and the rich liquid comprises decreasing the total amount of the lean liquid and the rich liquid by draining at least one of condensed water transformed from the first gas before the first gas flows into the absorber, condensed water transformed from the second gas, or condensed water transformed from the third gas, based on the liquid level.

* * * * *